(12) United States Patent
Vierheilig et al.

(10) Patent No.: US 7,587,955 B2
(45) Date of Patent: Sep. 15, 2009

(54) LUBRICATING UNIT

(75) Inventors: Gerald Vierheilig, Wuerzburg (DE);
Harald Maiss, Schwebheim (DE);
Michael Scholz, Poppenlauer (DE)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 11/781,385

(22) Filed: Jul. 23, 2007

(65) Prior Publication Data

US 2008/0019620 A1 Jan. 24, 2008

(30) Foreign Application Priority Data

Jul. 21, 2006 (DE) .................. 10 2006 033 852

(51) Int. Cl.
*F16H 27/02* (2006.01)
(52) U.S. Cl. .................. 74/89.44; 74/424.81; 74/467
(58) Field of Classification Search ............. 74/89.23, 74/89.44, 424.81, 424.7, 467
See application file for complete search history.

(56) References Cited

U.S. PATENT DOCUMENTS

| 3,588,200 | A | 6/1971 | Thomson |
| 5,492,413 | A | 2/1996 | Tsukada |
| 5,664,459 | A | 9/1997 | Muehleck et al. |
| 5,803,610 | A | 9/1998 | Takeuchi |
| 6,237,434 | B1 * | 5/2001 | Brown et al. ............. 74/424.82 |
| 6,568,508 | B2 * | 5/2003 | West et al. ..................... 184/5 |
| 2002/0056333 | A1 * | 5/2002 | Ohya et al. .............. 74/424.81 |
| 2005/0183526 | A1 * | 8/2005 | Yabe ......................... 74/89.44 |
| 2005/0252324 | A1 * | 11/2005 | Kato et al. ................. 74/89.44 |
| 2006/0076214 | A1 | 4/2006 | Yang et al. |

FOREIGN PATENT DOCUMENTS

| DE | 1 912 976 | 4/1970 |
| DE | 295 04 812.3 | 5/1995 |
| JP | 5 71443 | 9/1993 |
| JP | 2005-048846 | 2/2005 |
| JP | 2005-048864 | 2/2005 |

\* cited by examiner

*Primary Examiner*—David M Fenstermacher
(74) *Attorney, Agent, or Firm*—Michael J. Striker (57) ABSTRACT

A lubricating unit for rolling element tracks of a linear system includes a lubricating element housing in which a receiving space for a lubricating element is formed, the lubricating element housing is mountable on a movable element of the linear system using a plurality of latch elements fixed in position relative to the lubricating unit housing, the movable element is movably guided via the rolling of rolling elements along a guide element, which defines an axis of the linear system, the latch elements extend in the axial direction away from one axial end of the lubricating unit toward the movable element, and each latch element includes a bearing surface facing the lubricating element housing for engaging with a matching bearing surface, which is fixed in position relative to the movable element.

22 Claims, 6 Drawing Sheets

LUBRICATING UNIT

CROSS-REFERENCE TO A RELATED APPLICATION

The invention described and claimed hereinbelow is also described in German Patent Application DE 10 2006 033 852.9 filed on Jul. 21, 2006. This German Patent Application, whose subject matter is incorporated here by reference, provides the basis for a claim of priority of invention under 35 U.S.C. 119(a)-(d).

BACKGROUND OF THE INVENTION

The present invention relates to a lubricating unit for rolling element tracks of a linear system, and it relates to a linear system that includes a lubricating unit of this type. The lubricating unit includes a lubricating element housing, in which a receiving space for a lubricating element is formed.

Linear systems in the sense of the present application are rolling element screw drives (e.g., ball screw drives), rolling element bush guides (e.g., ball bush guides), and rolling element-supported profiled rail guides, which are often also referred to as linear guides. An aspect shared by all of these linear systems is that a movable element—which is designed, e.g., as a nut element or carriage element—is supported such that it is movable along a linear guide element, and a longitudinal displacement of the movable element takes place by rolling elements (balls or rollers) rolling between tracks formed on the movable element and the guide element. The rolling bodies move along a closed path in a rolling element circuit with a load channel formed between facing bearing surfaces on the linear guide element and on the movable element, and a return channel that connects the two ends of the load channel and is typically guided by the movable element.

To ensure that the rolling of the rolling elements is satisfactory, the tracks of linear systems of this type must be lubricated with a lubricant (typically a lubricating oil), mainly in the region of the load channel. To enable compensation of lubricant losses that unavoidably occur during operation of a system of this type, it is desired that lubricant be supplied continually during the entire operating period, the lubricant supply ideally remaining consistent for the entire duration of operation and being selected such that its level exactly compensates the lubricant losses. To this end, a lubricating element made of a lubricant-storing material is typically provided on the movable element.

Publication U.S. Pat. No. 5,492,413, for example, discloses a sealing plate for a carriage of a profiled rail guide that is supported such that it is movable along a guide rail. The sealing plate is mounted on both axial ends of the carriage and is bonded with a layer made of a lubricant-saturated, foamed material, which performs the lubricating function. The inner edge of this foamed material layer forms a lubricant delivery lip resting on the guide rail, which is supplied with lubricant from the surrounding regions of the foamed material layer. A further system for lubricating rolling element tracks of a profiled rail guide is made known in JP 5-71143 U. With this system, lubricant-saturated foamed material inserts are inserted in a receiving space of a sealing unit installed on the axial sides of the carriage. The insides of the foamed material inserts are in contact with the rolling element bearing surfaces of the guide rail.

Publication DE 295 04 812 U discloses a ball screw drive with a nut body that includes two circumferential grooves extending parallel to each other on its front end. A retaining ring is held in the first circumferential groove, which secures a ball deflection element, with which rolling balls can be transferred from a helical load channel formed between the inner surface of the nut and the outer surface of a spindle to a return channel formed in the nut and connecting the two axial ends of the load channel. A sealing body is secured in the second circumferential groove located closer to the front end of the nut body, which prevents foreign substances from entering the space formed between the inner surface of the nut and the outer surface of a spindle.

SUMMARY OF THE INVENTION

The object of the present invention is to provide a lubricating unit for rolling element tracks of a linear system, which can be mounted securely and as easily as possible on the axial end of a movable element, particularly a nut element or a bush element.

This object is attained according to the present invention by a lubricating unit for rolling element tracks of a linear system, including a lubricating element housing in which a receiving space for a lubricating unit is formed; the lubricating element housing is mountable on a movable element of the linear system using a plurality of latch elements fixed in position relative to the lubricating unit housing, the movable element being movably guided via the rolling of rolling elements along a guide element that defines an axis of the linear system; the latch elements extend in the axial direction away from one axial end of the lubricating unit toward the movable element, and each latch element includes a bearing surface facing the lubricating element housing for engaging with a matching bearing surface, which is fixed in position relative to the movable element.

A "surface facing the lubricating element housing" is understood to mean a surface located on a side facing the lubricating element housing. Likewise, a "surface facing the front side" is understood to mean a surface located on a side facing the pertinent front sides.

The lubricating unit can therefore be latched onto the movable element by making a simple motion in the axial direction toward the movable element; when a detent element is passed, the bearing surface of the latch hook of the lubricating unit comes to bear against the matching bearing surface. The bearing surface and the matching bearing surface are oriented relative to each other such that, when the two surfaces come to bear against each other, a motion of the lubricating unit and the movable element away from each other is prevented or at least made difficult.

Provided that, when the bearing surface and the matching bearing surface are engaged with each other, an end surface or a surface of the lubricating unit facing the front side bears against a corresponding end surface or the surface of a movable element facing the front side, the lubricating unit is completely secured on the movable element in the axial direction. Particularly in this case, it is helpful when the latch elements have a certain amount of elasticity themselves, so that the bearing surface can be pressed against the matching bearing surface and the end surfaces can be pressed against each other essentially simultaneously and with preload of the lubricating unit and the movable element relative to each other, so that the amount of axial play between the lubricating unit and the movable element is small or non-existent.

The lubricating unit is preferably annular in design on the axial end and includes an inner circumferential surface that concentrically encloses a cylindrical outer circumferential surface of the guide element. This design is suitable for guide elements with a circular cross section, e.g., the spindle of a ball screw drive or the cylinder guide of a ball bush guide. The lubricating unit then appends the movable element—designed as a nut or bush element—in the axial direction and forms its axial terminus.

The latch elements are preferably distributed around the circumference of the inner circumferential surface of the lubricating unit such that the bearing surface of each of the latch elements can bear directly or indirectly against an annular groove formed in an inner circumferential surface of the movable element, which encloses the guide element. The annular groove most favorably extends in the circumferential direction of the inner circumferential surface and, in fact, in the vicinity of the axial end of the nut or bush element on which the lubricating unit is to be installed. Grooves of this type are often located in nut or bush elements anyway, on the axial end of the inner circumferential surface between the assigned rolling element deflection and the end surface. These grooves typically serve to fasten the rolling element deflection or to fasten a seal, e.g., refer to DE 295 04 812 U. The fastening described therein of the lubricating unit with the aid of the nut makes it possible to retrofit existing linear systems with the inventive lubricating unit in a manner that is easy to realize.

With an annular groove of only limited depth, it is favorable to provide an additional retaining element for engaging in the annular groove, in order to improve the retention of the lubricating unit. The retaining element should be sized such that—when in the engaged state—it projects radially inwardly beyond the inner circumferential surface of the movable element. The matching bearing surface, i.e., the surface against which the bearing surface of one or more of the latch elements bears in the installed state, is formed on its side facing away from the front end of the movable element facing the lubricating unit. Depending on how far the retaining element projects radially inwardly, a more or less large overlapping surface region between the bearing surface and the matching bearing surface can be used, and, accordingly, the coupling of the lubricating unit and the movable element can withstand strong forces. This is true, e.g., because larger and more stable latch elements can be used, the larger the possible overlap region is of the bearing surface with the matching bearing surface.

The retaining element is typically a separate part from the lubricating unit and its lubricating element housing. For example, the retaining element can be a segmented split washer capable of being inserted in the annular groove such that its radial outer edge engages in the annular groove with preload. The segmented split washer is chosen to be slightly larger in the unloaded state than the cross section of the inner surface of the movable element. When the legs of the segmented split washer are pressed together, the cross section becomes smaller until it corresponds to that of the inner surface of the movable element. In this state, a radially outwardly directed clamping force acts on the legs, which holds them in the annular groove.

The latch elements are preferably radially outwardly oriented hook elements, with which an insertion bevel slanted toward the axial direction extends radially outwardly from the free end of each hook element and ends at the radially inwardly extending bearing surface. A latch element can slide along the insertion bevel via a retaining element secured in the groove. The bearing surface extends radially inwardly and, in fact, preferably essentially perpendicularly to the axis of the linear system, or even forming a rearward grip, to prevent the bearing surface and matching bearing surface from becoming detached simply when the lubricating unit moves in the axial direction away from the movable element.

The latch elements are typically designed to be elastically bendable in the radial direction, at least inwardly, so that the insertion bevel can easily slide past a retaining element located in the annular groove, and the latch element returns to its original position as soon as it has passed the bearing surface of the retaining element. The latch elements can be provided such that, in the unloaded state, they point outwardly—deviating slightly from the axial direction—and, in the engaged state, they are slightly preloaded in the radially outward direction. The latch elements can be preferably made of plastic, e.g., out of the same plastic as the lubricating element housing.

It is favorable when—provided there is maximum contact between the bearing surface and the matching bearing surface—the bearing surface and the matching bearing surface overlap further in the radial direction than the length of the radial distance between the inner—as viewed in the radial direction—surface of the latch elements and the outer surface of the guide element. This design ensures that the lubricating unit cannot become detached from the movable element when a guide element penetrates the central opening of the unit composed of movable element and lubricating unit.

In a simple variant, the latch elements can be provided directly on the axial end of the lubricating element housing facing the movable element. As such, they can be formed as a single piece with the lubricating element housing, in a cost-favorable manner. As an alternative, the latch elements can be provided on a mounting body that is separate from the lubricating element housing; the mounting body is capable of being coupled with the axial end of the lubricating element housing facing the movable element.

This variant ensures a somewhat more easily realized retention of the lubricating unit on the movable element in the axial direction, even against strong forces, because, by using suitable design measures, the lubricating element housing can be coupled with the mounting body such that it bears—without any axial play with an end surface facing the movable element—against an end surface of the movable element facing the opposite direction, and clamps the lubricating unit and the movable element. In contrast, a certain amount of axial play between the end surfaces and/or a certain elasticity of the latch elements are/is required to ensure axial retention when the latch elements are formed directly on the lubricating housing, in order to allow the snap-in connection between the bearing surface and the matching bearing surface to engage. This limits the level of clamping that can be attained.

The mounting body can be designed such that it is insertable in a front opening formed on the axial end of the lubricating element housing and is fixable in position on the lubricating element housing via one or more fastening elements that exert an inwardly acting force in the radial direction against an outer wall of the lubricating element housing. For example, the inner surface of the outer wall of the lubricating element housing can be brought into clamped engagement with a side wall of the mounting body inserted in the front opening using one or more clamps.

It is even more advantageous, however, when the mounting body is insertable in a front opening formed on the axial end of the lubricating element housing and is fixable in position on the lubricating element housing via one or more fastening elements that are guided through an outer wall of the lubricating element housing in the radial direction and are engaged with a side wall of the mounting body. Fastening elements of this type can be, e.g., threaded pins, which are screwed through the outer wall of the lubricating element housing and are either brought into clamping contact with the side wall or are screwed into the side wall. The "side wall of the mounting body" means a wall extending from its front side outward essentially in the axial direction of the linear system.

The mounting body can include a cylindrical side wall at least on its axial end, which is insertable in the lubricating element housing, in the outer surface of which a recess is formed, into which the fastening elements engage. This recess can be nearly an annular groove. As a result, it is ensured that the lubricating element housing takes on a predetermined axial position relative to the mounting body, e.g., in contact with the end surface of the movable element.

The bearing surface of the lubricating unit and the matching bearing surface fixed in position relative to the movable element prevent the lubricating unit and the movable element from moving away from each other when acted upon by a motion in the axial direction. The two bodies can be prevented from moving toward each other when acted upon by a motion in the axial direction via mutual contact of related end surfaces or via mutual contact of surfaces of both bodies facing the front end. In particular, when the clamping elements have a certain elasticity, this can also result in sufficient retention when the clamping elements are formed on the lubricating element housing.

The two bodies can be better secured relative to each other, however, when the lubricating element housing includes a thread on its outer surface, onto which a lock nut is screwable; the lock nut is screwed on to fix the lubricating element housing in place in the axial direction as it bears against the axial end face or an end face of the movable element facing the axial end face. The lubricating unit can then be clamped against the movable element using the lock nut, so that the unit no longer has play in the axial direction. This is helpful, in particular, with the single-piece design of the lubricating element housing and the latch elements described above.

For example, an annular receiving space for a lubricating element made of a lubricant-storing material can be formed in the lubricating element housing. The receiving space is bounded by the inner wall of the lubricating element housing, which encloses the guide element.

The lubricating element can include a body made of a lubricant-storing material, which includes an application section capable of being brought in contact with a rolling body bearing surface to dispense lubricant. In a first storage region adjoining the application section, the body can have a longitudinally extending shape. A lubricant flow through the first storage region triggered via the dispensing of lubricant on the application section is essentially oriented in its longitudinal direction.

With an annular lubricating element housing, the body of the lubricating element can be annular in shape, or it can be designed as a long strand wound in the shape of a helix.

Given an annular extension of the axial end of the lubricating unit, the lubricating unit can be mounted on the nut element using the inventive latch hooks such that any rotary position between the lubricating unit and the nut element can be steplessly selected. This makes it possible to adjust the axial position of the carrier to a certain thread pitch by rotating the lubricating unit and the nut element relative to each other accordingly.

A "lubricant-storing material" is understood to mean a material that can be saturated with a lubricant (i.e., a liquid with suitable viscosity) and that is capable of storing a certain quantity of this lubricant. When the term "effective porosity" is used to describe the portion of the volume formed by cavities or pores in a material of a specified total volume of the material, this means that a lubricant-storing material has an effective porosity greater than zero and less than one. The effective porosity can be a constant, but it is often the case that the effective porosity depends on the quantity of a stored lubricant, because the pores can expand as the quantity of stored lubricant increases. The body of the lubricating element can be formed, e.g., of an open-cell foamed material.

The body can be formed, e.g., of an open-cell foamed material. Ester-based PUR foamed materials have proven to be a suitable foamed material, for example. Foamed materials of this type can be foamed and then pressed to form plates having a desired pore size. Plates have proven suitable, for example, the relative density of which, after pressing, is between 60 and 250 kg/m$^3$, particularly approximately 200 kg/m$^3$. Foamed materials of this type are available under the trade names Inducon, Normont, and Cellofoam. In the past, it has been shown that these foamed materials are suitable in terms of their wear resistance and chemical resistance, and in terms of their lubricant absorption capacity.

The body can be cut out of a foamed material plate, e.g., using water-jet cutting, and is relatively easy to manufacture in this manner.

With the lubricating unit, an annular receiving space for a lubricating element can be made of a lubricant-storing material, e.g., in a cylindrically designed lubricating element housing; the receiving space is bounded by the inner wall of the lubricating element housing, which encloses the guide element. An opening can be formed in the inner wall of the receiving wall, through which the application section of the lubricating element is guided in order to contact the rolling body bearing surface. With a rolling element screw drive, e.g., the application section guided through the opening comes in contact with a spiral running groove for the rolling elements formed in the outer surface of the spindle.

To attain the greatest flexibility possible with a rolling element screw drive in particular, it can also be provided that an application nose is insertable in the inner wall of the lubricating element housing, in which the opening for the application section is formed. This application nose can be slidable into the inner wall, e.g., in the axial direction. By providing various positionings of the axial position of the opening for various application noses, the same lubricating element housing can be used for different thread pitches on the spindle. When holes with different-sized cross sections are also provided in the application nose, the same lubricating unit—its housing, in particular—can also be used for several ball diameters. This results in an extraordinarily great deal of flexibility.

Finally, it can be provided that the receiving space is closed by a cover. The cover can also perform further functions, e.g., it can seal off the carriage or protect the nut from contamination, in particular.

When the lubricating unit includes a device for fastening the cover or for sealing it, which corresponds to the device of the carriage or the nut for attaching the inventive lubricating unit, a further inventive lubricating unit can also be installed using latch hooks on a first inventive lubricating unit mounted on the nut. This could become necessary, e.g., with nuts having more than two supporting thread turns, since the two nut end faces no longer suffice as bearing surfaces for the lubricating units.

With a linear system, particularly a rolling element screw drive or a ball screw drive, a profiled rail guide or a bush guide, considerable advantages are attained when an inventive lubricating unit is installed. The linear system includes an element that is movably guided via rolling elements along a linear guide element, e.g., in the form of a nut or carriage element. The lubricating unit is installed on an axial end of the nut or carriage element. With a nut or carriage element provided with a lubricating unit on both axial ends, lubrication of the rolling element tracks can take place even in the load channel in any direction of motion before the rolling elements guided in their endless circuit come in contact with the bearing surface. This results in extremely efficient lubrication that requires a very small amount of lubricant.

The inventive lubricating unit is suited most particularly when the linear system is a rolling element screw drive, particularly a ball screw drive, including a spindle as the guide element, and a nut element enclosing the spindle, as the movable element; at least one nut groove with two end regions—the nut groove extending around the axis in the manner of a helix and guiding rolling elements—is formed in the inner circumferential surface of the nut element, the nut groove defining—together with the outer circumferential surface of the spindle—a helical rolling element screw path extending between the two end regions; the rolling element screw path is appended by a rolling element return path extending between the two end regions to form a closed rolling element recirculating path, which is filled with an endless row of rolling elements—ready to roll at all times—lying in the nut groove and on a helical trajectory of the outer circumferential surface; a rolling element deflection for transferring the rolling elements between the rolling element screw path and the rolling element return path or between the rolling element return path and the rolling element screw path is located on the nut element in each of the end regions.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
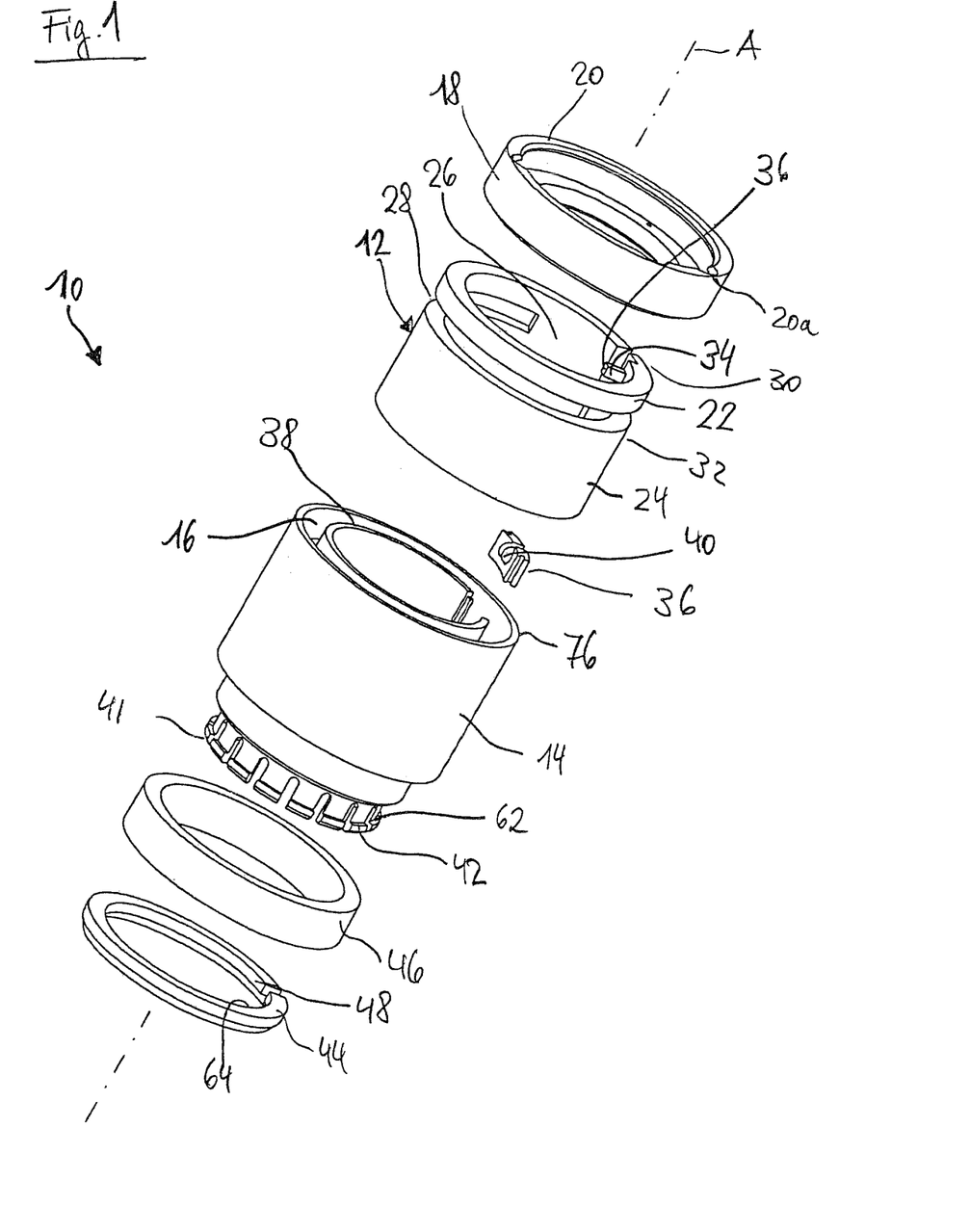
FIG. 1 shows a perspective exploded view of a first embodiment of an inventive lubricating unit designed to be installed on the axial end of a nut element of a rolling element screw drive.

FIG. 1 shows a perspective exploded view of an inventive lubricating unit for a rolling element screw drive; it is labeled in general with numeral 10. Lubricating unit 10 is designed to be installed on the axial end of a nut element of the rolling element screw drive. Lubricating unit 10 includes a main body 14, which is also referred to as the lubricating element housing, in which an annular receiving space 16 is formed. A lubricating element 12 made of a foamed material and saturated with a lubricant is inserted in receiving space 16. Receiving space 16 is closed with a cover 18, which is set in place after lubricating element 12 is installed on main body 14. A seal is located in cover 18, which bears against the upper surface of the spindle of the rolling element screw drive and ensures that no foreign subjects enter the intermediate space between the nut element and the spindle surface. The seal therefore serves to hermetically seal the rolling element running channel formed between the nut element and the spindle. Projecting edge 20 formed on the front side of cover 18 includes several recesses 20a, into which an assigned projection of the seal (not shown in FIG. 1) can engage. This allows the seal to be fixed in place relative to the cover and prevented from rotating in the circumferential direction. To adapt to different thread pitches, one of the recesses 20a in which the seal is inserted is assigned to a predetermined thread pitch, thereby ensuring that the seal can always engage with the helical running element bearing surface.

Lubricating element 12 shown in FIG. 1 is designed essentially annular in shape overall, with a first storage region 22, which extends in an annular manner and has the shape of a strand with a relatively small cross section, and with a second storage region 24, which also extends in an annular manner in wide regions and is located concentrically with first storage region 22. Second storage region 24 adjoins first storage region 22 as a single piece in a transition section 26 located between first storage region 22 and second storage region 24 in the axial direction. First storage region 22 and second storage region 24 are separated from each other by an annular gap 28 located outside of transition section 26.

The annular contour of first storage region 22 and second storage region 24 is not entirely closed, but rather has an essentially axially extending opening gap 30, 32.

An application section 34 projecting toward the inside of the ring abuts the free end of first storage region 22. Application section 34 is cut as a single piece out of the material forming first storage region 22 and is folded over toward the ring axis. In the state of being installed for operation, free end 35 of application section 34 bears against the rolling element track designed in the shape of a spiral in the outer surface of the spindle. Lubricating element 12 saturated with lubricant gradually dispenses lubricant to the rolling element track via n application section 34.

Lubricating unit 10 includes a separate application nose 36, which is insertable in the axial direction into inner circumferential wall 38 of lubricating element main body 14. An opening 40 is formed in application nose 36, through which—when lubricating element 12 is installed—application section 34 projecting inwardly from first storage region 22 is guided, so that its free end 36 bears against the rolling element track.

Various lubricating elements 12 can be inserted in receiving space 16, provided they have its essentially annular shape with the outer diameter and inner diameter only in the region between outer wall 76 and inner wall 38 of annular receiving area 16. Lubricating element inserts 12 are saturated with a lubricant, e.g., oil, before or immediately after they are inserted into receiving space 12.

On its front end bearing against the nut element of the rolling element screw drive, main body 14 includes latch hooks 42 that extend in the axial direction and are distributed concentrically along its inner surface. With the embodiment shown, lubricating unit 10 is mounted on the nut element of the rolling element screw drive using latch hooks 42, a clamping ring 44 designed as a segmented split washer, and a lock nut 46. To this end, latch hooks 42—which have an insertion bevel 41 slanted in the axial direction and extending from their free end, insertion bevel 41 extending radially outwardly and terminating at a radially inwardly extending bearing surface 62—are inserted with their free end first into the opening formed in the front side of one of the nut elements. Insertion bevel 41 slides along a projection fixed in place relative to the nut element, and latch hooks 42 bend slightly radially inwardly. As soon as insertion bevel 41 has passed the projection, the latch hooks engage via their bearing surface 62 pointing toward main body 14 of lubricating unit 10 with a matching bearing surface 64 formed on the projection, matching bearing surface 64 being located on the side of the projection facing away from main body 14.

Matching bearing surface 64 is fixed in place relative to an annular groove (56, see FIG. 3) formed in the inner surface of nut element 50. Annular groove 56 normally serves to accommodate the seal designed to protect nut element 50 against penetration by foreign substances from the outside, the seal now being located in cover 18 when lubricating unit 10 is installed. To ensure a better retention of lubricating unit 10 in annular groove 56, the engagement of latch hooks 42 in annular groove 56 does not take place directly, but rather via auxiliary clamping ring 44. Clamping ring 44 includes a projection 48 extending in the circumferential direction on its inner circumferential edge, which extends much further inward than the very shallow depth of annular groove 56. Projection 48 is the detent projection. The use of clamping ring 44 makes it possible to use larger latch hooks 42, the bearing surface 62 of which overlaps matching bearing surface 64 in a much larger area, matching bearing surface 64 being formed on the side of projection 48 opposite to lubricating unit 10. The retention between lubricating unit 10 and nut element 50 is therefore much better than when bearing surface 10 would engage in annular groove 56 directly.

Lock nut 46 serves to ultimately fix lubricating unit 10 in position axially on the nut. Lock nut 46 engages via its inner thread 66 in a thread 68 cut into an outer surface of outer wall 76 of main body 14 of lubricating unit 10 and, after bearing surface 62 of latch hooks 42 engage with matching bearing surface 64 of projection 48, it is pulled tightly and brought to bear against an end face of nut element 50.

To illustrate the interrelationships described above, FIG. 2 shows lubricating unit 10 in FIG. 1 in the assembled state, but still as a separate component and not installed on the nut element of a ball screw drive.

Figure 3:
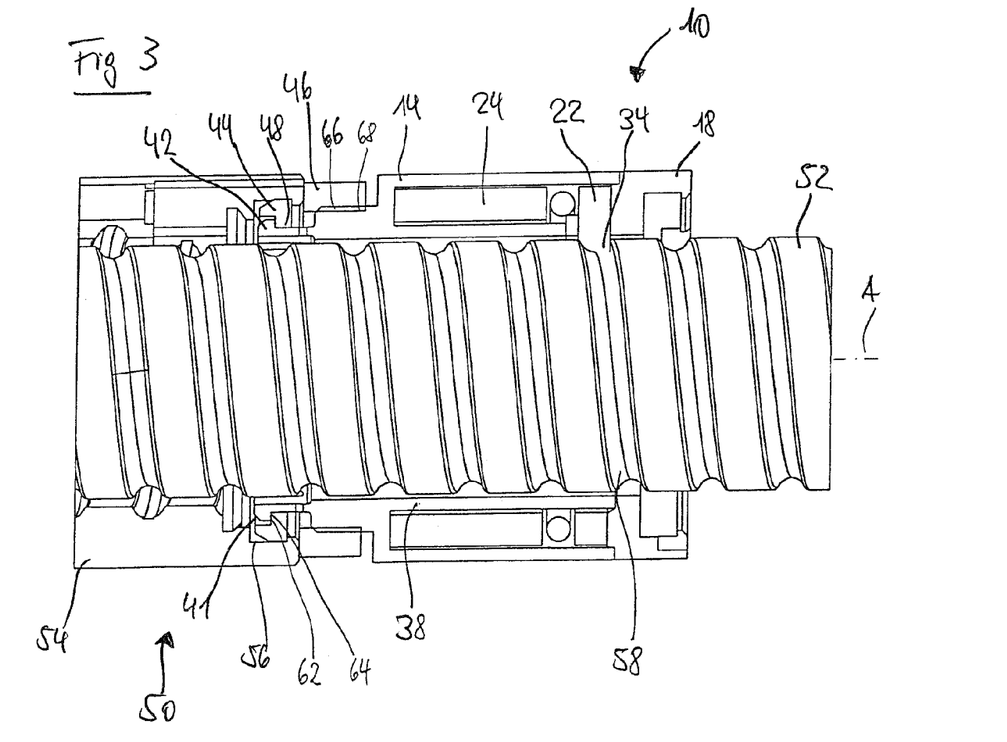
FIG. 3 shows a cross-sectional view through the lubricating unit shown in FIGS. 1 and 2 in a state in which it is installed on the axial end of a nut element of a ball screw drive.

The cross-sectional view in FIG. 3 shows how lubricating unit 10 is installed on nut body 54 of a ball screw drive composed of a nut element 50 and a spindle 52 that defines an axial direction A. Auxiliary clamping ring 44 is inserted in annular groove 56 formed on the inner surface of nut body 54 and bears tightly against its base under the effect of its radially inwardly directed preload. Latch hooks 42 also bear via their bearing surface 62 against matching bearing surface 64 of projection 48 of clamping ring 44—which projects radially inwardly and extends in the circumferential direction—and secures lubricating unit 10 against a motion in the axial direction away from nut main body 54. The distance between the inner—in the radial direction—surface of latch hooks 42 and the outer—in the radial direction—surface of spindle 52 is chosen to be so small that latch hooks 42 cannot become disengaged from projecting section 48 of auxiliary clamping ring 44 when spindle 52 is inserted. The unit composed of nut element 50 and lubricating unit 10 must therefore be removed before lubricating unit 10 can be removed. Since latch hooks 42—when engaged with auxiliary clamping ring 44—also have a certain amount of preload in the radially outward direction, an external force that presses latch hooks 42 inward is required to disengage them from auxiliary clamping ring 44.

Lubricating unit 10 is ultimately fixed in position in the axial direction on nut main body 54 by tightening lock nut 46 relative to nut main body 54, the inner thread 66 of which is engaged with outer thread 68 cut in the outer surface of outer wall 76 of main body 14, i.e., on its axial end facing nut element 50.

In FIG. 3 it is shown that application section 34 extending inwardly in the radial direction away from the first storage region engages in rolling element running groove 58 formed in a spiral shape in the outer surface of spindle 52, so that its free end is in contact with the base of the rolling element running groove. The elasticity of application section 34 made of a foamed material ensures that, during operation of the ball screw drive, the free end of application section 34 is always in contact with the rolling body bearing surface and can provide it with lubricant.

Figure 4:
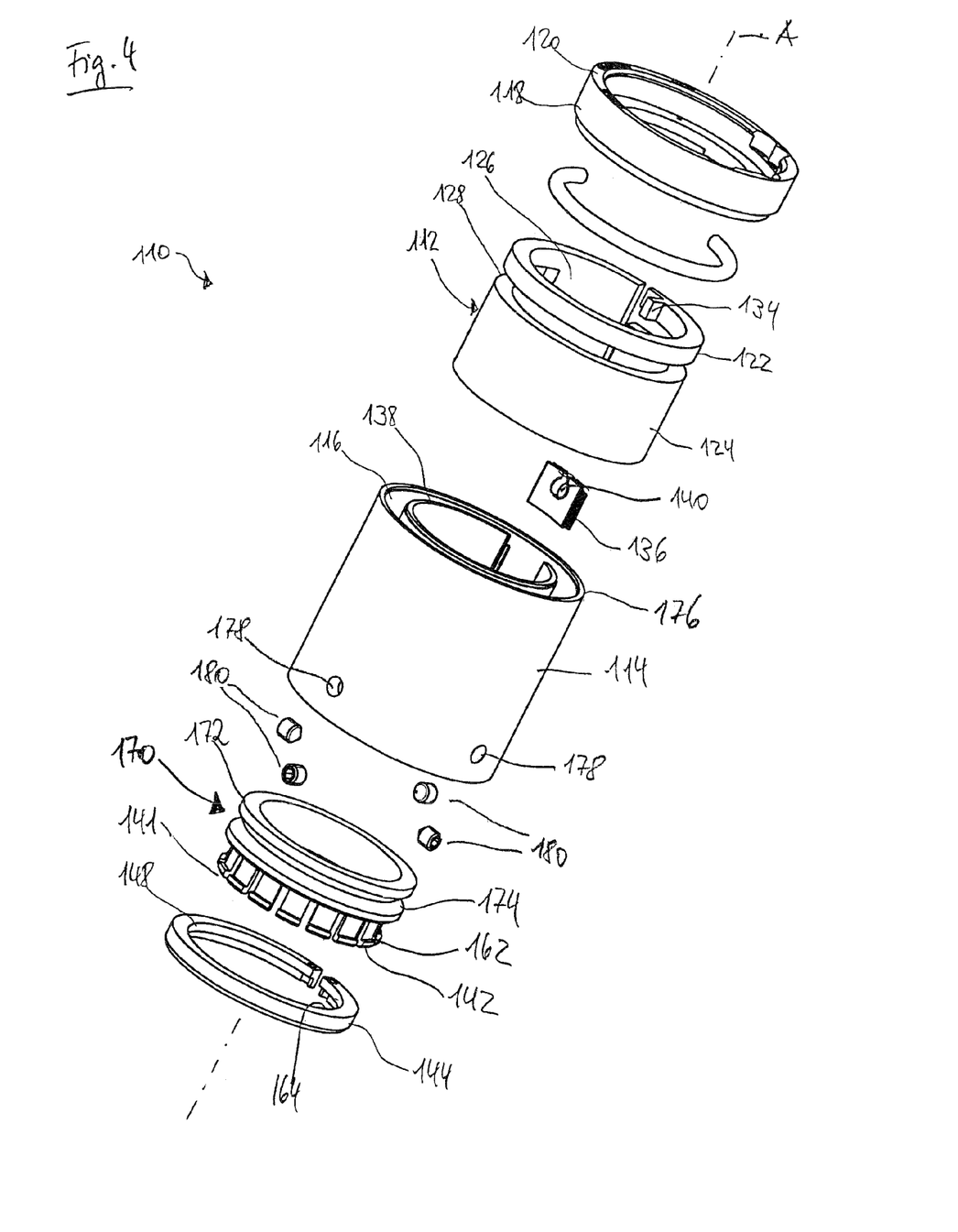
FIG. 4 shows a perspective exploded view of a second embodiment of an inventive lubricating unit designed to be installed on the axial end of a nut element of a rolling element screw drive.
Figure 5:
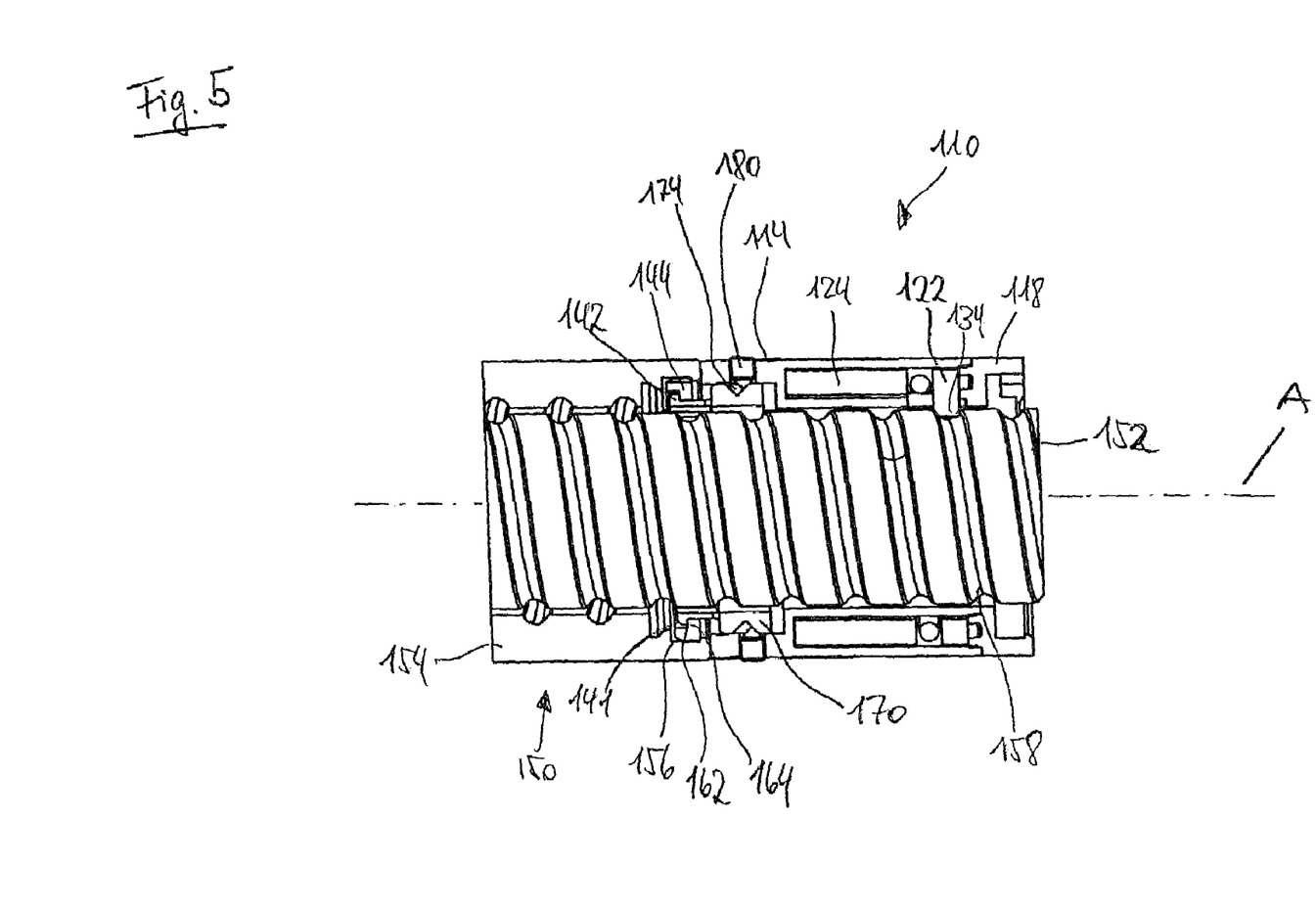
FIG. 5 shows a cross-sectional view through the lubricating unit shown in FIG. 4 in a state in which it is installed on the axial end of a nut element of a ball screw drive.

FIGS. 4 and 5 show a second embodiment of inventive lubricating unit 10, which is also designed to be installed on the axial end of a nut element of a rolling element screw drive. The views shown in FIGS. 4 and 6 correspond to the views in FIGS. 1 and 3. With the lubricating unit shown in FIGS. 4 and 5, the components that correspond to the components of lubricating unit 10 in FIGS. 1 and 3 are labeled with the same reference numerals plus 100. To prevent unnecessary repetitions, only the differences in the embodiment shown in FIGS. 4 and 5 compared with the embodiment described above will be described in greater detail, and reference is made to the description of the previous figures for explanation of the remaining aspects.

In the perspective, exploded view of lubricating unit 110 shown in FIG. 4, latch hooks 142 are not formed on main body 114 of lubricating unit 110, but on a mounting body 170 that is separate from main body 114. Mounting body 170 is designed essentially annular in shape with a side wall 172, the inner surface of which encloses guide element 152, and the outer surface of which is provided with annular groove 174. Latch hooks 142 are provided on the front side of mounting body 170 facing nut element 150, the tips of which are oriented essentially parallel to the axis of nut element 150. Mounting body 170 is attached to nut element 150 via latch hooks 142 and auxiliary clamping ring 144 in exactly the same manner used with the embodiment shown in FIGS. 1 through 3, and reference is hereby made to that description.

To install lubricating unit 110 on nut element 150, mounting body 170 is first snapped into place together nut element 150. Main body 114 is then guided over the front end of mounting body 170 extending away from the axial end of the nut body, so that the inner surface of outer wall 176 of main body 114 is opposite to the outer surface of side wall 172 of mounting body 170. Four bore holes 178 are formed in outer wall 176 of main body 114 equidistantly from each other in the circumferential direction, through each of which a threaded pin 180 is screwed. The front end of each of the threaded pins 180 engages with the outer surface of side wall 172 of mounting body 170, thereby securing mounting body 170 on main body 114.

The engagement parts of threaded pins 180 on the side wall of mounting body 170 are located in annular groove 174. The nearly beveled shape of the base of annular groove 174 ensures that main body 114 is pulled into an axial position when threaded pins 180 are secured; in the axial position, the end surface of main body 114 comes to bear against the opposing end surface of nut element 150. In this manner, main body 114 clamps lubricating unit 110 onto nut element 150. In this manner, axial play between bearing surface 162 and matching bearing surface 164 is eliminated, thereby ensuring that bearing surface 162 and matching bearing surface 164 cannot become disengaged. With this embodiment, it is therefore possible to eliminate an additional lock nut.

To clarify the interrelationships, FIG. 5 shows a cross-sectional view through the lubricating unit shown in FIG. 4 in a state in which it is installed on the axial end of a nut element 150 of a ball screw drive.

Figure 6:
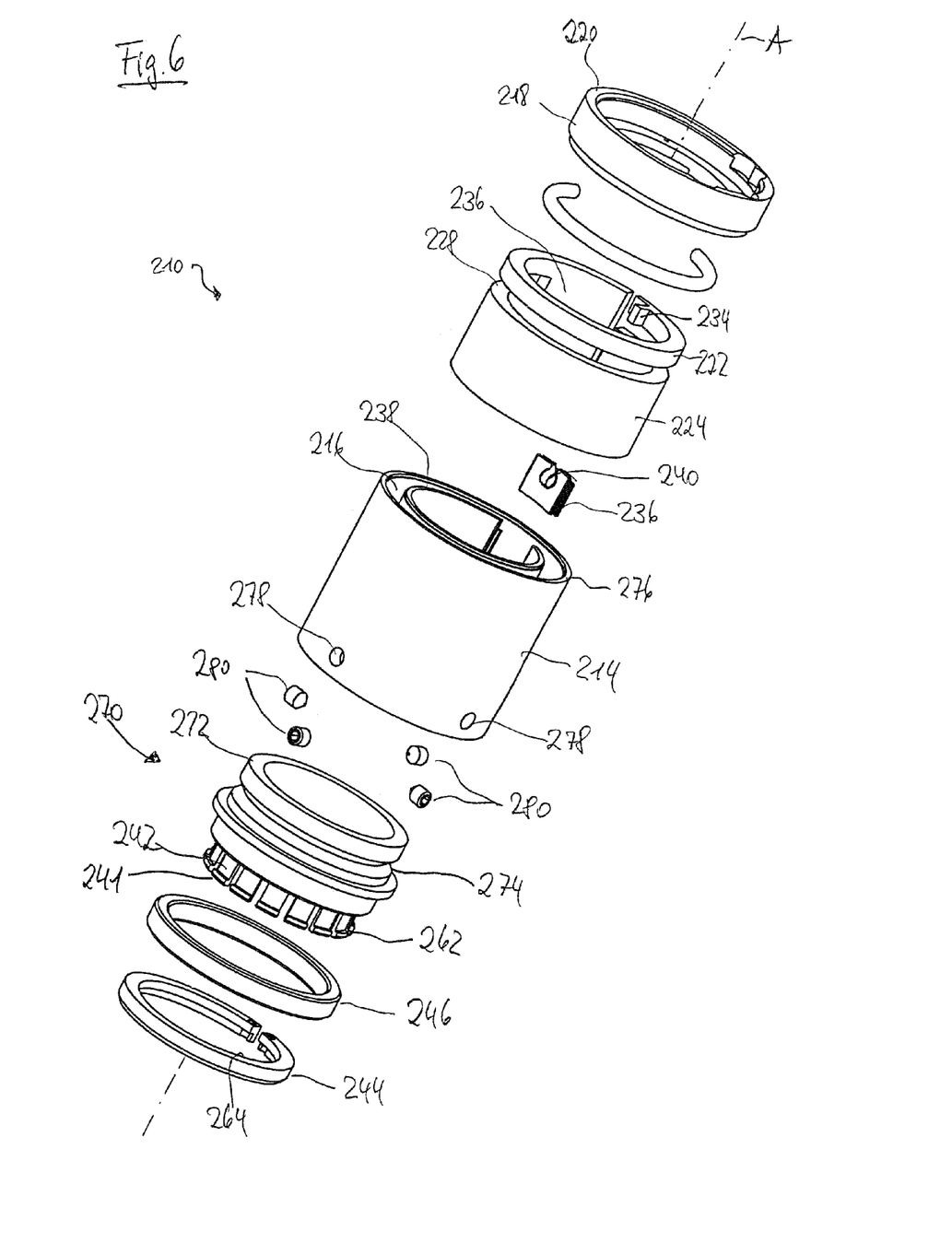
FIG. 6 shows a perspective exploded view of a third embodiment of an inventive lubricating unit designed to be installed on the axial end of a nut element of a rolling element screw drive.
Figure 7:
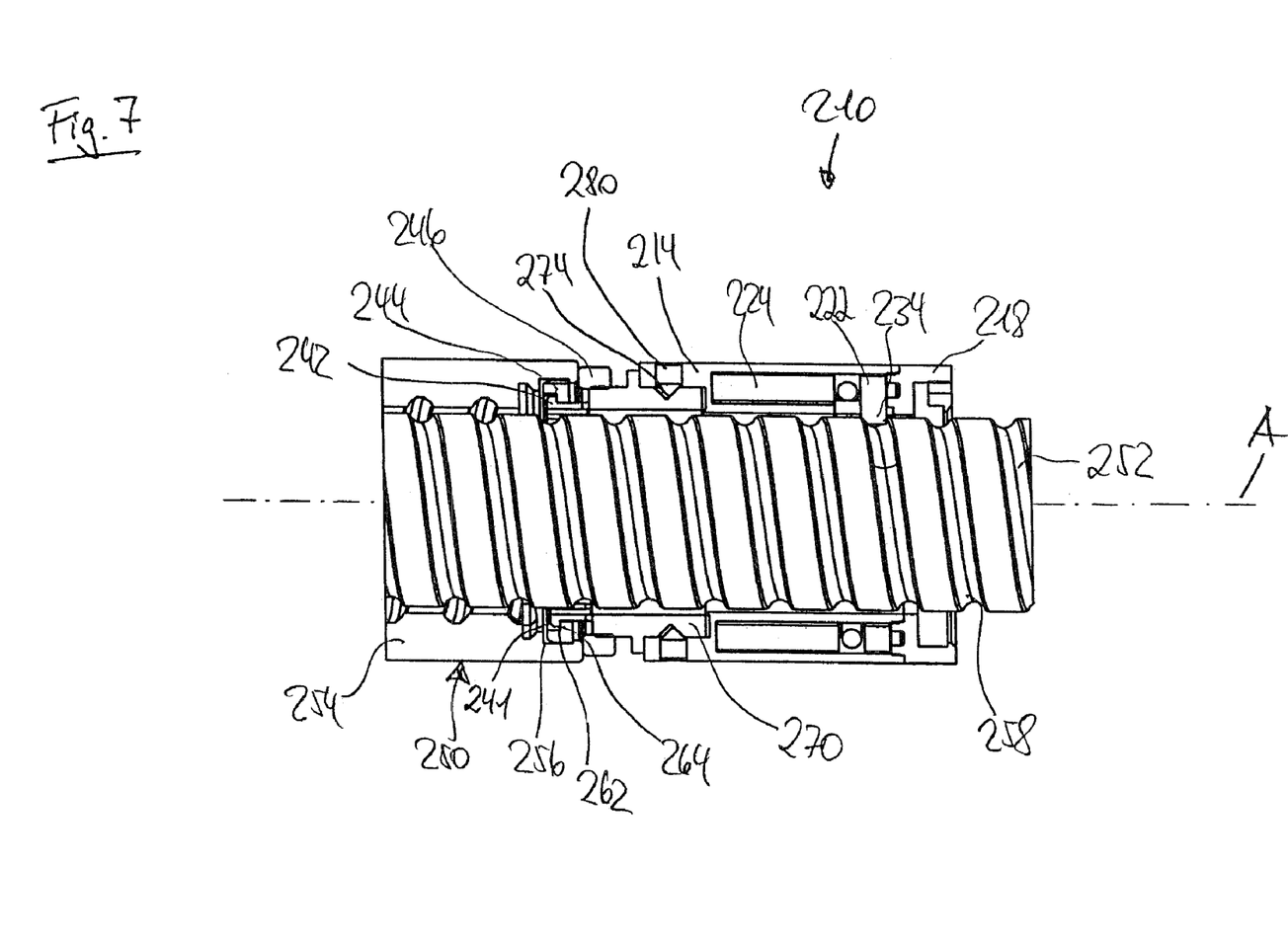
FIG. 7 shows a cross-sectional view through the lubricating unit shown in FIG. 6 in a state in which it is installed on the axial end of a nut element of a ball screw drive.

FIGS. 6 and 7 show a third embodiment of inventive lubricating unit 210, which is also designed to be installed on the axial end of a nut element of a rolling element screw drive. The views shown in FIGS. 6 and 7 correspond to the views in FIGS. 1 and 3, and FIGS. 4 and 5. With lubricating unit 210 shown in FIGS. 6 and 7, the components that correspond to the components of lubricating unit 10 in FIGS. 1 and 3 are labeled with the same reference numerals plus 200. To prevent unnecessary repetitions, only the differences in the embodiment shown in FIGS. 6 and 7 compared with the embodiments described above will be described in greater detail, and reference is made to the description of the previous figures for explanation of the remaining aspects.

Figure 2:
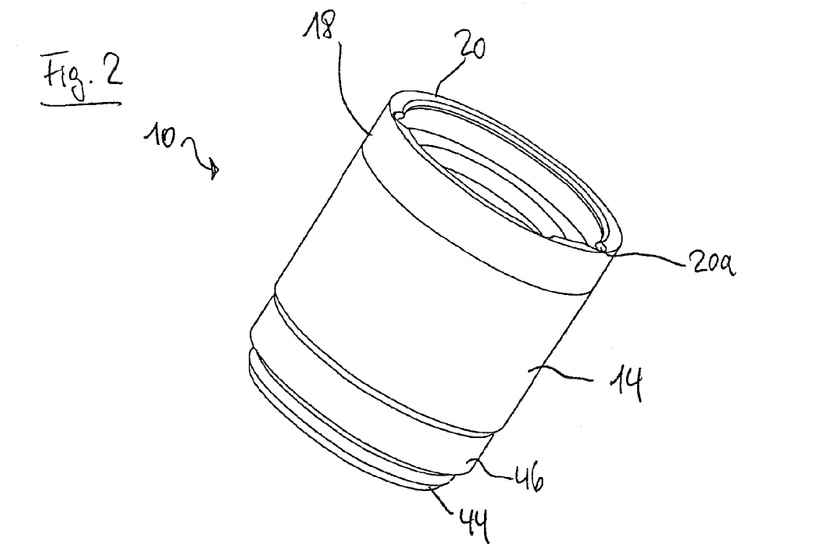
FIG. 2 shows the lubricating unit in FIG. 1, in the assembled state.

The embodiment shown in FIGS. 6 and 7 essentially correspond to a combination of the embodiment with lock nut for clamping the lubricating unit together with nut element according to FIGS. 1 through 3, and the multi-component embodiment with main body and separate mounting body according to FIGS. 4 and 5. When the main body is coupled with the mounting body, the lubricating unit is simultaneously clamped together with the nut element by the main body coming to bear against an end surface of the nut element. The view shown in FIG. 6 corresponds to the views in FIGS. 1 and 4. The view in FIG. 7 corresponds to the views in FIGS. 3 and 6. Since, in this embodiment, additional clamping is attained via the engagement of threaded pins 280 guided through the outer wall of main body 214 in annular groove 274 on the mounting body, thereby bringing the end face of main body 214 of lubricating unit 210 in contact with the end face of nut element 250, and via the tightening of lock nut 246, a particularly efficient method of clamping lubricating unit 210 together with nut element 250 is attained.

Mounting body 170, 270—which is designed to be separate from main body 114, 214 and which is used in the embodiments depicted in FIGS. 4 through 7—makes it possible to install elements other than the lubricating unit on the nut body, such as stripping units or seals. They therefore need not be equipped with hooks, which are complex. The same mounting body 170, 270 can be used as the adapter for all elements to be attached.

It will be understood that each of the elements described above, or two or more together, may also find a useful application in other types of constructions differing from the type described above.

While the invention has been illustrated and described as embodied in a lubricating unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A lubricating unit for rolling element tracks of a linear system, comprising a lubricating element housing provided with a receiving space; a lubricating element provided in said receiving space of said lubricating element housing; a plurality of radially inwardly bendable latch elements mounting said lubricating element on a movable element of a linear system fixed in a position relative to said lubricating unit housing; a guide element along which said movable element is movably guided and which defines an axis of the linear system via rolling of rolling elements, said latch elements extending from one axial end of the lubricating unit in an axial direction toward said movable element, and each of said latch elements including a substantially radially extending bearing surface that faces said lubricating element housing and engages with a substantially radially extending matching bearing surface which is fixed in position relative to said movable element.

2. A lubricating unit as defined in claim 1, wherein said guide element has a cylindrical outer circumferential surface, the lubricating unit being annular in shape on an axial end and having an inner circumferential surface that concentrically encloses said cylindrical outer circumferential surface of said guide element.

3. A lubricating unit as defined in claim 2, wherein said movable element has an inner circumferential surface which is provided with an annular groove that encloses said guide element, said latch elements being distributed around a circumference of the inner circumferential surface of the lubricating unit such that said bearing surface of each of said latch elements bears directly or indirectly against said annular groove formed in said inner circumferential surface of said movable element.

4. A lubricating unit as defined in claim 1, further comprising a retaining element for engaging in said annular groove, which is sized so that, when in an engaged state, it projects radially inwardly beyond said inner circumferential surface of said movable element and forms said matching bearing surface on a side facing away from a front end of said movable element facing the lubricating unit.

5. A lubricating unit as defined in claim 4, wherein said retaining element is configured as a segmented split washer which is insertable in said annular groove such that its radial outer edge engages in said annular groove with preload.

6. A lubricating unit as defined in claim 1, wherein said latch elements are configured as radially outwardly extending hook elements.

7. A lubricating unit as defined in claim 1, wherein said latch elements are elastically bendable in a radial direction, at least inwardly.

8. A lubricating unit as defined in claim 1, wherein said bearing surface and said matching bearing surface are configured so that with a maximum contact between said bearing surface and said matching bearing surface, said bearing surface and said matching bearing surface overlap in a radial direction further than a length of a radial distance between an inner, as viewed in a radial direction, surface of said latch elements and an outer surface of said guide element.

9. A lubricating unit as defined in claim 1, wherein said latch elements are provided on an axial end of said lubricating element housing facing said movable element.

10. A lubricating unit as defined in claim 1, further comprising a mounting body that is separate from said lubricating element housing and coupled with an axial end of said lubricating element housing facing said movable element, said latch elements being provided on said mounting body.

11. A lubricating unit as defined in claim 10, wherein said lubricating element housing has a front opening formed on its axial end, said mounting body is inserted in said front opening and fixed in position against said lubricating element housing, further comprising at least one fastening element that fixes said mounting body in position against said lubricating element housing and exerts an inwardly acting force in a radial direction against an outer wall of said lubricating element housing.

12. A lubricating unit as defined in claim 10, wherein said lubricating element housing has a front opening formed on its axial end, said mounting body is inserted in said front opening and fixed in position against said lubricating element housing, further comprising at least one fastening element that fixes said mounting body in position against said lubricating element housing, is guided through an outer wall of said lubricating element housing in a radial direction, and engages with a side wall of said mounting body.

13. A lubricating unit as defined in claim 12, wherein said mounting body has a cylindrical outer wall which at least in its axial end is inserted into said lubricating element housing and has an outer surface with a recess, in which said at least one fastening element engages.

14. A lubricating unit as defined in claim 2 wherein said lubricating element housing has an outer surface provided with a thread, further comprising a lock nut screwed onto said thread and fixing said lubricating element housing in place in an axial direction as it bears against an axial end face or an end face of said movable element pointing toward said axial end face.

15. A lubricating unit as defined in claim 1, wherein said receiving space for said lubricating element is formed as an annular receiving space composed of a lubricant-storing material in said lubricating element housing, said lubricating element housing having an inner wall which bounds said receiving space and encloses said guide element.

16. A lubricating unit as defined in claim 15, wherein said receiving space has an inner wall provided with an opening, through which an application section of said lubricating element is guided in order to contact a bearing surface of the rolling element.

17. A lubricating unit as defined in claim 16, wherein said opening through which said application section is guided is formed in an aplication nose which is insertable in an inner wall of said lubricant element housing.

18. A lubricating unit as defined in claim 1, further comprising a cover that closes said receiving space.

19. A linear system, comprising a guide element that defines an axis of the linear system; a movable element which is movably guided along said guide element via a rolling motion of rolling elements; and a lubricating unit mounted on said movable element for rolling element tracks of the linear system and including a lubricating element housing provided with a receiving space; a lubricating element provided in said receiving space of said lubricating element housing, a plurality of latch element mounting said lubricating elements on a movable element of the linear system fixed in a position relative to said lubricating unit housing, a guide element along which said movable element is movably guided and which defines an axis of the linear system via rolling of rolling elements, said latch element extending from one axial end of the lubricating unit in an axial direction toward said movable element, and each of said latch elements including a bearing surface that faces said lubricating element housing for engaging with a matching bearing surface which is fixed in position relative to said movable element.

20. A linear system as defined in claim 19, wherein the linear system is configured as a rolling element screw drive.

21. A linear system as defined in claim 19, wherein the linear system is configured as a rolling element screw drive formed as a ball screw drive, the linear system comprising a spindle as the guide element, and a nut element enclosing said spindle as the movable element; at least one nut groove with two end regions extending around an axis in a manner of a helix and guiding rolling elements and formed in an inner circumferential surface of said nut element and also defining together with an outer circumferential surface of said spindle a helical rolling element screw paths extending between the two end regions, said rolling element screw path being appended by a rolling element return path extending between the two end regions to form a closed rolling element recirculating path which is filled with an endless row of rolling elements that roll at all times and lie in said nut groove and on a helical trajectory of the outer circumferential surface, wherein a rolling element deflection for transferring said rolling elements between said rolling element screw path and said rolling element return path or between said rolling element return path and said rolling element screw path is located on said nut element in each of said end regions.

22. A lubricating unit as defined in claim 1, wherein said lubricating element housing has an outer surface provided with a thread, further comprising a lock nut screwed onto said thread and fixing said lubricating housing in place in an axial direction, said lock nut concentrically surrounding said guide element.

* * * * *